Figure 1:
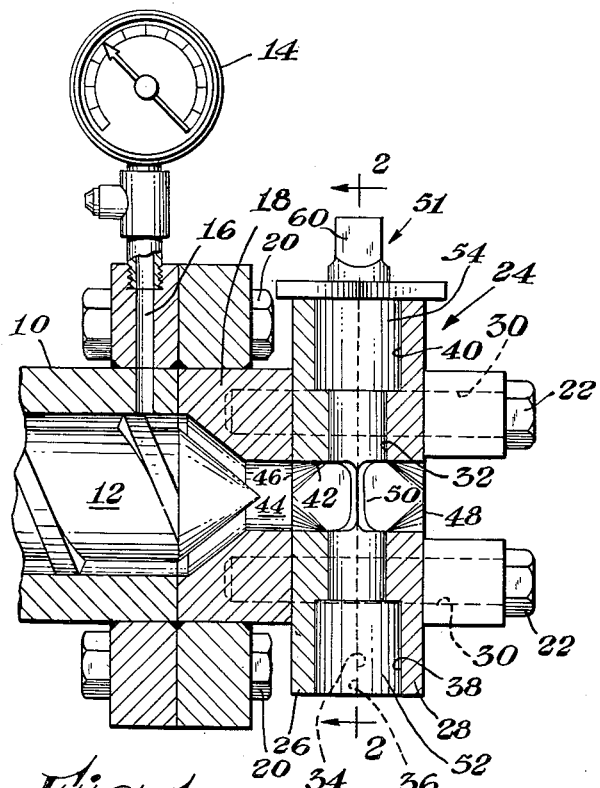

Aug. 21, 1962     A. J. PALFEY     3,050,084
VALVE FOR CONTROLLING BACK PRESSURE IN PLASTIC EXTRUDERS
Filed Aug. 4, 1960

INVENTOR.
Albert J. Palfey
BY Earl D. Ayers
AGENT

р

United States Patent Office 3,050,084
Patented Aug. 21, 1962

3,050,084
VALVE FOR CONTROLLING BACK PRESSURE
IN PLASTIC EXTRUDERS
Albert J. Palfey, Midland, Mich., assignor to The Dow Chemical Company, Midland, Mich., a corporation of Delaware
Filed Aug. 4, 1960, Ser. No. 47,427
2 Claims. (Cl. 137—625.32)

This invention relates to an apparatus for the continuous extrusion of thermoplastic materials. More specifically, it relates to valve apparatus for the control of back pressure on thermoplastic materials being extruded.

The function of conventional thermoplastic extruders is to receive a solid granular feed and melt it to a homogenous composition, then pump it through a nozzle and die to form some desired shape.

Conventional thermoplastic processing extruders generally receive solid granular or molten feed as well as other admixes as pigments, plasticizers, stabilizers or other materials. These extrusion machines must provide intense blending of the admixes to provide an acceptable homogenous composition. The product may be pumped through a nozzle and die, hence be solidified and granulated as feed stock for future extrusion, or, the molten or plastic product may be discharged into a conduit to additional machinery for processing.

It is well known that a variation in thermoplastic pressure at the extrusion screw discharge results in variations in the mixed quality of the extrude. Generally, an increase in extrusion head pressure provides for better mixing quality.

In the extrusion of thermoplastics through a die to form some desired shape, there is an exact head pressure of operation for a given die which will produce the most economical product. An extruder producing a homogenous product at a high rate of discharge may not be extruding the proper shape because of improper head pressure. Therefore, having the ability to infinitely vary the extruder head pressure would permit one to extrude thermoplastics in a more economical manner.

Some thermoplastic extrusion machines are equipped with means of providing controllable head pressure. However, they are not completely satisfactory. Hankey Patent No. 2,770,836 teaches the use of a movable bushing which seats on the rotating extrusion screw tip to restrict flow. A small increment of adjustment of this apparatus often produces too great a pressure variation. Also, if the adjustment is improperly made, screw and bushing metal to metal contact will result in metal galling. In addition, this apparatus is not adaptable to extruders which are rigidly coupled to further processing equipment.

Other extruders are equipped with conventional ball or cylindrical type full flow valves. Although they provide for infinite pressure control, they do not permit the valve to purge or clean itself, hence thermoplastics which become clogged are degraded through decomposition.

Still other extruders are equipped with fixed screen packs to provide head pressure.

Accordingly, a principal object of this invention is to provide improved valve apparatus for achieving infinite back pressure control for thermoplastic extrusion machines.

Still another object of the invention is to provide a valve which will not retain and degrade thermoplastics.

A further objective is to provide an improved means of controlling back pressure while continuosly extruding thermoplastics without subtraction or addition of parts.

Figure 2:
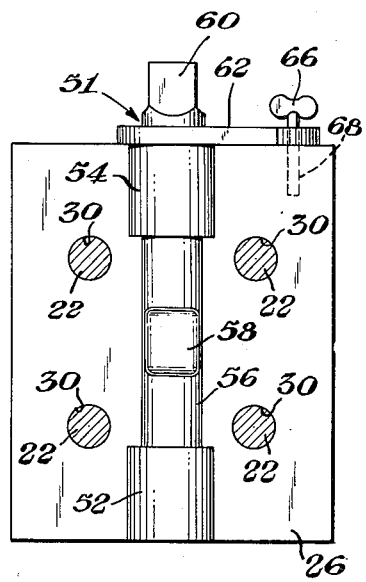
Figure 3:
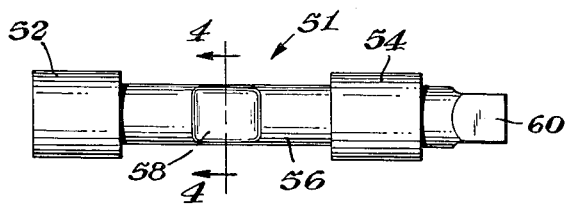
Figure 4:
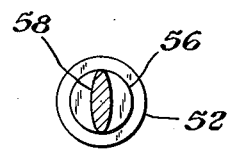
Figure 5:
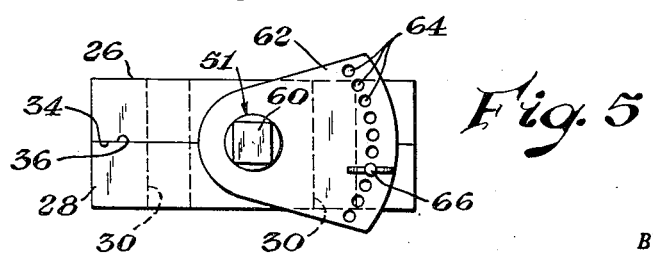

The above and related objects of the invention will best be understood when the following detailed description is read in connection with the accompanying drawing, in which:

FIG. 1 is a side elevational view, partly in section, of a valve assembly in accordance with this invention;
FIG. 2 is an end elevational view of the valve assembly shown in FIG. 1;
FIG. 3 is a side elevational view of the valve core used in the valve assembly;
FIG. 4 is a sectional view taken along the line 4—4 of FIG. 3;
FIG. 5 is a fragmentary plan view of the valve assembly shown in FIG. 1.

Referring to the drawings, and particularly to FIG. 1, there is shown the output end of an extruder barrel 10 having a rotatable extruder screw 12 disposed therein. A pressure gauge assembly 14 is mounted near the output end of the barrel 10 and communicates with the interior of the extruder barrel by means of a hollow tube 16. The pressure gauge assembly and tube are conventionally filled with silicone grease and provide an external indication of the thermoplastic pressure at the discharge end of the extruder screw 12.

A stationary nozzle 18 is secured to the output end of the extruder barrel 10 by means of the bolts 20. Attached to the output side of the nozzle 18 by means of bolts 22 is the valve assembly of this invention, indicated generally as 24.

The body of the valve assembly 24 comprises two joined together rectangular, block-like plates 26, 28 having mating contiguous surfaces, usually flat on form. Bores 30 extend through both plates 26, 28 to accommodate the mounting bolts 22. The plates 26, 28, when joined tightly together to form a unitary structure, have a bore 32 extending therethrough from one end to the other, the mating surfaces 34, 36 of the plates 26, 28 being at least approximately on the centerline or axis of the bore 32.

The bore 32 has counterbore parts 38, 40, at either end thereof, the counterbores each extending inwardly from the surface of the plate approximately 20 percent of the length of the plate in the direction the bore 32 extends.

A nozzle bore 42 extends transversely through the plates 26, 28 in axial alignment with the output bore 44 of the stationary nozzle 18. Although the input end 46 and output end 48 of the nozzle bore 42 is of circular transverse cross-sectional configuration, the cross-sectional configuration is changed gradually in the inward direction from both ends until it has a generally square cross-sectional configuration at the part of the bore 50 where the mating surfaces 34, 36 of the plates 26, 28 meet.

The valve stem, indicated generally by the numeral 51 of the assembly 24 is shown in detail in FIGS. 3 and 4. The valve stem has two large diameter cylindrical end sections 52, 54 whose diameter is such that they fit closely with the counterbores 38, 40 in slide fitting relationship. Between the large diameter sections is a section 56 which is cylindrical in cross-sectional configuration except for the central part 58 thereof which is the part which lies across the bore 42.

The central section of the valve stem is machined to have a stream-lined elliptical shape, as shown in FIG. 4, whose thickness is a minor fraction of the diameter of the nozzle bore 42.

A square head 60 is provided at one end of the valve stem 51 for use in rotating the valve stem. As best shown in FIG. 5, a quadrant type valve locking plate 62 having pin bores 64 extending therethrough in a radial array, is secured to the valve stem 51. A pin 66, extending through one of the bores 64 and into a bore 68 (see FIG. 2) in the top of the valve body plate 28 is used to hold the valve in a selected position. If infinite positioning is desired, the quadrant bores 64 may be replaced by a continuous slotted arc and the pin 66 replaced by a locking cap screw.

If diammetrical clearances of 0.001 inch to 0.0015 inch are maintained between the valve stem and body plate bore no valve packing will be required due to the high viscosity of the thermoplastic (exudate).

In operation the valve stem 51 may be turned and locked in any desired position to maintain a desired back pressure as shown by the gauge 14. As may be seen from its structure, the valve is adapted to infinitely vary the back pressure and will not retain or degrade the plastic material flowing past the valve.

I claim:

1. A control valve for varying over a wide range the back pressure at the output end of an extruder, comprising a block-like valve body, means for coupling said valve body to an extruder output means in a fluid-tight manner, said valve body being composed of two plates each having a surface which is adapted to mate with the corresponding surface of the other plate, the body having a nozzle bore, said nozzle bore having a central part which is square in transverse cross sectional configuration and ends which are circular in transverse cross sectional configuration, and an intermediate part on each side of said central part which varies symmetrically from square to circular in transverse cross sectional configuration, which extends transversely through the plates and is adapted to communicate with a nozzle bore of said extruder, a valve stem bore, said valve stem bore extending edgewise through said valve body, the longitudinal axis of said valve stem bore intersecting the longitudinal axis of the nozzle bore in said central part thereof, said valve stem bore being counter-bored at each end thereof, the counter-bored parts of the bore having a constant diameter and being coaxial with the remainder of the bore, a valve stem, said valve stem being disposed within said valve body and having a body part and larger cylindrical parts at each end of the body part, the diameter of said larger cylindrical part being slightly smaller than the diameter of said counter-bored part, said body part of the valve stem being cylindrical except for the central section along the length thereof, the diameter of the body part of the valve stem being smaller than the diameter of the valve stem bore, said central section of the valve stem body part being that part of the valve stem which intersects the nozzle bore, said central part of said valve stem being symmetrically thinned to a minor fraction of the diametrical thickness of the rest of the valve stem body, and means for rotating said valve stem over a predetermined range and for securing said valve stem with respect to said valve body.

2. A control valve in accordance with claim 1, wherein said central part of said valve stem has an elliptical transverse cross sectional configuration.

References Cited in the file of this patent

UNITED STATES PATENTS

| | | |
|---|---|---|
| 2,780,834 | Bernhardt | Feb. 17, 1957 |
| 2,804,648 | Strauss | Sept. 3, 1957 |
| 2,952,041 | Bernhardt | Sept. 13, 1960 |

FOREIGN PATENTS

| | | |
|---|---|---|
| 1,171,636 | France | Jan. 28, 1959 |